Dec. 18, 1956     T. BAKER     2,774,170

FISH LURE

Filed June 22, 1954

SECTION A-A

INVENTOR.
TREVOR BAKER

BY L. D. Michelman
atty

United States Patent Office 2,774,170
Patented Dec. 18, 1956

2,774,170

FISH LURE

Trevor Baker, Palmer, Mass.

Application June 22, 1954, Serial No. 438,453

1 Claim. (Cl. 43—42.5)

This invention is concerned with lures, and particularly those used for attracting fish. Heretofore, there have been many lures appearing on the market and it is a purpose of this invention to provide improvements and refinements in these lures.

Despite many allegations, the lures now available fail to move through the water in a manner that simulates a fish. It is the principal purpose of this invention to provide a lure that not only simulates a live fish as it is pulled through the water, but that will not sink and get caught on the bottom.

It is an object of this invention to provide a fishing lure that wabbles as it is pulled in water.

It is another object of this invention to provide a lure that remains upright and does not rotate on its own axis as it is pulled in water.

It is yet another object of this invention to provide a lure that has strong buoyant characteristics, despite the fact that it is of a material having a greater density characteristic than water.

It is a further object of the invention to provide the lure with artistic characteristics such as reflecting color and the actual appearance of a live shiner.

It is an additional object of the invention to provide a lure that can be manufactured and sold at a minimum of cost.

With the above objects and features in mind, and such other objects and features as may become apparent as the specification is read, the invention consists of the arrangement and construction as illustrated in the accompanying drawings, in which.

Similar reference characters are used to designate the like parts throughout the several figures of the drawings and in the specification.

Figure 1:
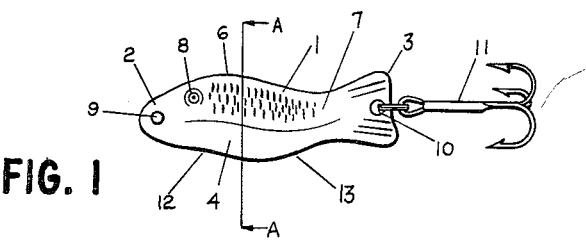
Figure 1 is a side elevation view of the lure.

Referring now to the various views of the drawings, the body 1 of the lure is in the shape of a fish. There is a head 2, a tail 3, a belly 4 and a back 6. Imbedded in the metal material that makes up the body 1 is a series of indentations that simulate the scales of a fish. Included in these markings is a simulated fish eye 8. At the head 2 is an opening or eye 9 through which the fisherman's line is strung and secured. In the tail 3 is an opening or eye 10 in which the fish hooks 11 are secured.

Upon a closer look at Figure 1, it is to be noted that along the lowermost portion of the belly 4 are two curved continuous edge surfaces 12 and 13. Each of these edge surfaces is in the form of a Figure S. In other words, the lowermost portion of the belly 4 comprises two edge surfaces that form successive S's. The first S starts at the head 9 and terminates at line A—A. The second S starts at line A—A and terminates at the second S starts at line A—A and terminates at the tail 3. A single S edge surface is at the top of the lure in Figure 1. This S edge runs from the head 2 to the tail 3 along the top edge surface of the lure (the back of the fish).

Figure 2:
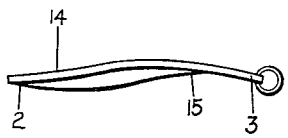
Figure 2 is a view looking down on the view of Figure 1.

Reference is now made to Figure 2. This is a view from above looking down on the lure of Figure 1. There are two specific and crucial points of the invention shown herein. At the head 2 is a surface that is directed upward from an imaginary longitudinal axis that extends from the head 2 to the tail 3. This is designated as 14. The other crucial point is the direction of the tail 3. In Figure 2 it is directed downward from the longitudinal axis and opposite from the head 2. The direction is designated by numeral 15. A single reverse S-shaped edge surface delineates the top or "back" of the lure as shown in Figure 1. This reverse S-shaped edge courses from the head 2 to the end of the tail 3.

Figure 8:
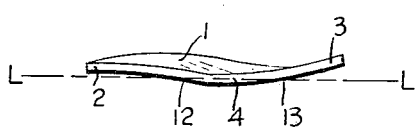
Figure 8 is a view looking up at the view of Figure 1.

Figure 8 shows a view looking up at the belly 4 of the lure as shown in Figure 1. A longitudinal axis is indicated by the line L—L. The axis L—L passes through the belly portion 4 of the lure. The head surface 2 in this view is inclined downwardly from the axis L—L. The tail surface 3 is inclined upwardly from the axis L—L.

Figure 3A:
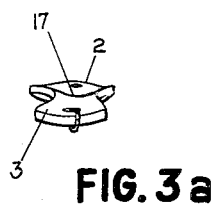
Figure 3a is a view looking at the tail of the lure and with the side surface of Figure 1 facing downward.
Figure 3B:
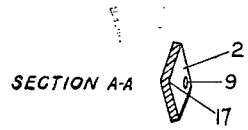
Figure 3b is a view looking at the cross section of the lure at line A—A in Figure 1.
Figure 4:
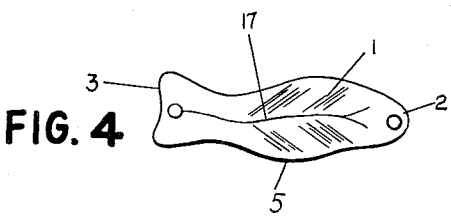
Figure 4 is a rear side elevation view of Figure 1.

Figure 4 shows a view of the opposite side of the lure shown in the view of Figure 1. This reverse or opposite side of the lure is concave with the bottom of the concavity extending for a good part of the length of the lure and being indicated by the line 17. It can be more easily understood by the views of Figures 3a and 3b. Figure 3a shows how the tail 3 slopes in an opposite direction from the head 2 and also the converging surfaces at 17. Figure 3b is an exaggerated cross section view of Figure 1 along line A—A. It is here noted that the head 2 slopes away from the middle portion of the lure and in the opposite direction from the tail 3.

Figure 5:
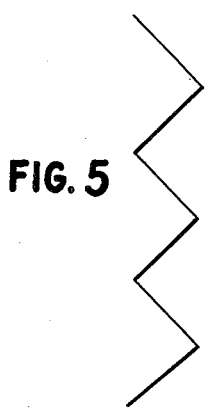
Figure 5 is a view looking down on the path of one type of lure of the prior art as it moves through the water.
Figure 6:
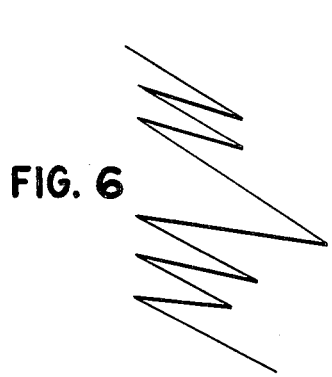
Figure 6 is a view looking down on the path of another type of lure of the prior art as it moves through the water.
Figure 7:
Figure 7 is a view looking down on the path of the lure described herein as it is pulled through the water.

Figures 5 and 6 show the paths that two typical lures readily obtainable in the commercial market, both of different design take as they are pulled through the water. Figure 7 shows the path of the lure herein as it is pulled through the water. As can be seen from a comparison of these figures, the lure herein wabbles as it is pulled through the water. The lure of Figure 5 zigzags and the one of Figure 6 zigzags and then swings out of the pattern. As can be seen, the motion of the wabble is more simulating than the motion of a fish. Accordingly the path of the lure herein makes for a close resemblance to a real live fish.

Another important motion of the fish is its vertical motion. Because of the concave surfaces converging at 17, the water pressure acts equally upon the lure herein as it is pulled. The lure accordingly tends to remain in a substantially vertical position as shown in Figure 1 while it makes a path of a wabbler.

Further, the lure, when thrown in the water, by virtue of its comparatively large surface area (with regard to its size) will not sink quickly. This feature will also make for less entanglement on the bottom of the lake or stream.

The lure can be painted gold or silver so as to reflect light. A high polish metal is preferred since this is not likely to rust, and would be more permanent.

I claim:

A fish lure comprising a comparatively thin body having a general longitudinal axis extending from a head end thereof to a tail end, said body having eyes at the respective ends thereof; said lure having at its forward end a downwardly inclined portion on the lateral surface of the lure; the tail portion of the lure on the same side presenting an upwardly inclined surface with respect to the said longitudinal axis of the lure, when viewed from below; the back or upper edge of the lure having a single reverse S formation from head to tail, the opposite or belly edge having an approximate double S formation from head to tail; the said lateral surface having scales and markings thereon resembling those of a fish, the other lateral surface or reverse side being concave from a point slightly to the rear of the head opening to the tail; the lower portion of the concavity being delineated by a line having the tail end thereof slightly inclined with respect to the remainder of the line when in plan the head end of the lure being directed upwardly and the tail end downwardly with respect to the said axis when viewed from above.

References Cited in the file of this patent
UNITED STATES PATENTS

| | | |
|---|---|---|
| 2,478,085 | Bruington | Aug. 2, 1949 |
| 2,542,606 | Westerfors | Feb. 20, 1951 |
| 2,624,147 | Round | Jan. 1, 1953 |